United States Patent

[11] 3,624,306

[72] Inventor George H. Myers
190 Wyoming Ave., Maplewood, N.J. 07040
[21] Appl. No. 108,286
[22] Filed Jan. 21, 1971
[45] Patented Nov. 30, 1971
Continuation-in-part of application Ser. No. 800,872, Feb. 20, 1969, now abandoned. This application Jan. 21, 1971, Ser. No. 108,286

[54] METHOD AND SYSTEM FOR COMPRESSING BANDWIDTH
16 Claims, 6 Drawing Figs.

[52] U.S. Cl. 179/15.55 R
[51] Int. Cl. H04b 1/66
[50] Field of Search 179/15.55, 15 BW; 178/6, DIG. 3

[56] References Cited

UNITED STATES PATENTS 2,732,424 1/1956 Oliver 179/15.55
2,921,124 1/1960 Graham 179/15.55
3,324,237 6/1967 Cherry 179/15.55

*Primary Examiner*—Kathleen H. Claffy
*Assistant Examiner*—Jon Bradford Leaheey
*Attorney*—Popper, Bain, Bobis & Gilfillan

ABSTRACT: A method and system for compressing required bandwidth for signals possessing redundancy, without substantial loss of intelligence or signal-to-noise ratio. This is effected by sampling the input signal to yield an appropriate first group of samples, transforming the said group into a second group of samples displaying reduced power but yet retaining intelligence and signal-to-noise ratio, and then operating upon the transformed sample group to recover original power levels—and in the process reducing required bandwidth. A system is disclosed wherein these operations are effected by applying the input signal to a tapped delay line—the outputs from said line comprising the aforesaid first group of samples. Such outputs are each applied through weighting networks to derive the transformed, low-power, second sample group. After being passed through analog-to-digital converters, the low-power samples, then in parallel binary form, are gated and passed through a suitable delay line to effectively combine the low-power samples into higher power signals of number per unit time reduced in comparison to the original sampling rate.

INVENTOR
GEORGE H. MYERS
BY
Popper, Bain, Bobis, & Gilfillan
ATTORNEYS

INVENTOR
GEORGE H. MYERS
BY
Popper, Bain, Bobis + Gilfillan
ATTORNEYS

INVENTOR
GEORGE H. MYERS
BY
Popper, Bain, Bobis + Gilfillan
ATTORNEYS

INVENTOR
GEORGE H. MYERS
BY
Popper, Bain, Bobis + Gilfillan
ATTORNEYS

INVENTOR
GEORGE H. MYERS
BY
Popper, Bain, Bobis + Gilfillan
ATTORNEYS

METHOD AND SYSTEM FOR COMPRESSING BANDWIDTH

This application is a continuation-in-part of my copending application, Ser. No. 800,872, filed Feb. 20, 1969, now abandoned.

This invention relates to a method and system for compressing the bandwidth of a signal without loss of intelligence by removing the redundancy in the signal without degrading the signal-to-noise ratio.

Most signals such as are common in, for example, television and telemetry contain a considerable amount of redundancy. If means can be found which will eliminate the redundancy, without materially affecting the signal intelligence, considerably bandwidth can be saved. This conservation of bandwidth is all to the good since one is then able to transmit several signals in the spectrum space now occupied by s single signal or to utilize lower radio frequencies for the transmission of signals which now require higher frequencies because of their bandwidth.

If a signal does not contain sufficient redundancy, it is not readily possible, at present, to reduce the bandwidth appreciably without loss of signal intelligence.

It is an important object of the invention to provide a method and a system for compressing the bandwidth of a signal without degradation of intelligence or of the signal-to-noise ratio.

It is a further object of the invention to provide such a method and a system wherein the bandwidth compression may be accomplished for either digital or analog transmission.

It is an additional object of the invention to provide such a method and system, whereby a uniform sampling rate may be maintained at the system output.

These and other objects, advantages, features and uses will be apparent during the course of the following description when taken together with the accompanying drawings, wherein.

Figure 2:
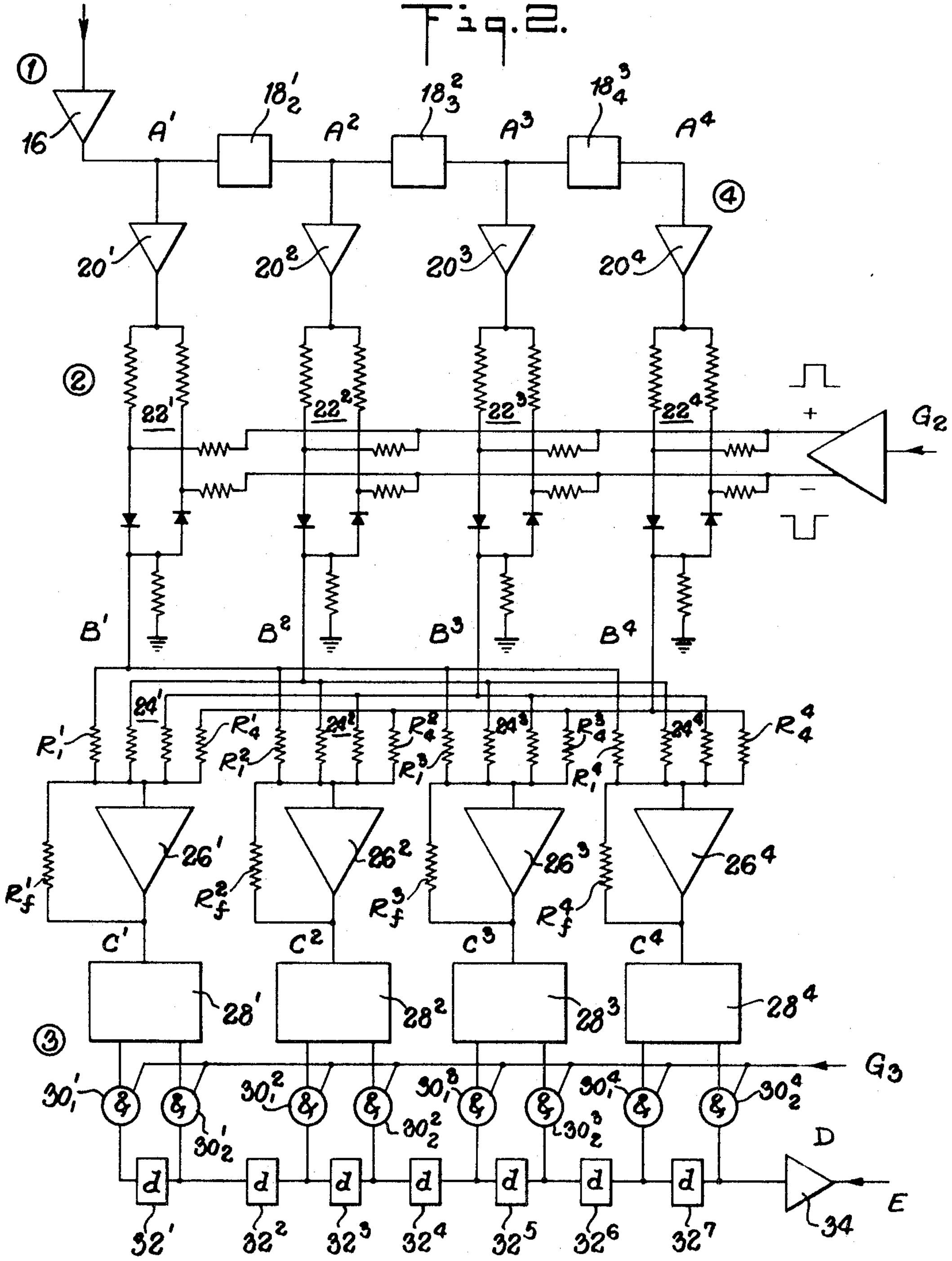
FIG. 2 is a circuit diagram of a system of the invention for reducing the bandwidth to one quarter the original bandwidth.
Figure 3:
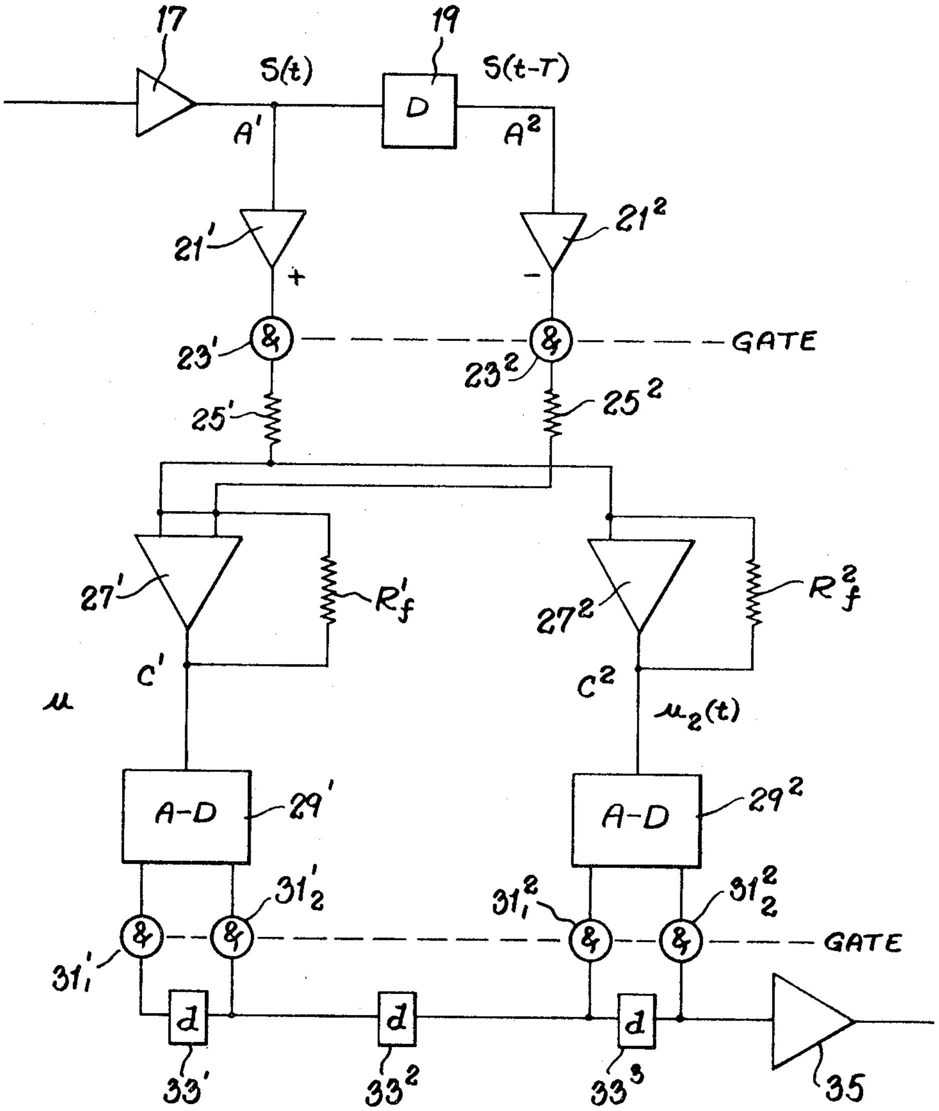
FIG. 3 is a diagram similar to that of FIG. 2 of a system of the invention for reducing the bandwidth to one half the original bandwidth.

It should be noted that FIGS. 2 and 3 are only two examples of an infinite number of combinations which may be used to carry out and practice the teaching of the invention. They are included as illustrative of the invention and not to limit the scope thereof.

Broadly, the invention is directed toward compressing the bandwidth of signals possessing redundancy without loss of intelligence or signal-to-noise ratio. In accordance with the invention this is effected by sampling the input signals to yield an appropriate first group of samples, transforming the said group into a second group of samples displaying reduced power but yet retaining intelligence and signal-to-noise ratio, and then operating upon the transformed sample group to recover original power levels—and in the process reducing required bandwidth. In a representative system these operations are effected by applying the input signal to a tapped delay line—the outputs from said line comprising the aforesaid first group of samples. Such outputs are each applied through weighting networks to derive the transformed, low-power second sample group. After being passed through analog-to-digital converters the low-power samples, then in parallel binary form, are gated and passed through a suitable delay line to effectively combine the low-power samples into higher power signals of number per unit time reduced in comparison to the original sampling rate. These latter signals, while substantially retaining the original intelligence and signal-to-noise ratio of the input signal, may then be transmitted with much reduction in required bandwidth.

In order for the system of the invention to operate beneficially, the input signal must contain some redundancy whose general nature is known. This redundancy is then exchanged or traded for bandwidth reduction. If the data is completely random, then reduction of bandwidth may cause errors or loss of power level. The actual, statistical details of the signal need not be known, it is sufficient that one know the time periods over which substantial correlation exists, on the average.

Following is a descriptive analysis of the system of the invention to aid in the understanding of the broad aspects of the invention.

Suppose the input signal $s(t)$ is sampled at a fixed rate, so that the interval between samples is T seconds. Every $(n+1)$s amples are combined into a new sequence of $(n+1)$ samples of another signal $u(t)$ by the following formula:

$$u_j(t)=a_{oj}s(t)+a_{ij}s(t-T)+ \ldots +a_{nj}s(t-nT) \quad \text{(Equation A)}$$

where $j=o, i, \ldots n$

After $(n+1)$ samples of $u$ have been generated by $(n+1)$ samples of $s$, the process repeats with a new sequence of $(n+1)$ samples of $s$.

This equation may also be written as:

$$u_j(t_i)=\sum_{i=0}^{n} a_{ij}s(t-iT) \qquad \text{(Equation B)}$$

where $j=o, i, \ldots n$

It will be shown in the following that if the coefficients $a$ are properly chosen, then the sequence of $u(t)$'s will have a lower power level than the sequence of $s(t)$'s and that the $s(t)$'s may be recovered from the $u(t)$'s. This development will indicate the proof for average transmitted power. However, since in any practical communications system the signals must be limited in amplitude because of practical limitations on the components, the same proof would apply to peak power. The development will first be by a simple example, and then the general case will be considered.

First an example considered in the prior art will be discussed, which is very similar to the procedure to be considered here. Suppose $$u(t)=0.707(s(t)-s(t-T)). \quad (1)$$

Note that in this method, $u(t)$ is always calculated from the same coefficients. Suppose $s(t)$ is a stationary, band-limited, time series with average power $P_o$ and autocorrelation function $\Phi(q)=E[s(t)s(t+q)]$. If $\Phi$ is very small for $q=T$, then the power in $u$ and the power in $s$ are nearly identical, and there is no advantage to the encoding process. On the other hand, if $\Phi$ is near its maximum value of $P_o$, then the power in $u$ will be much less than the power in $s$. The signal may be recovered by the relation:

$$s(t)-1.414u(t)+s(t-T)$$

The previous sample must always be known. Since at the start of transmission the initial value is always zero, the signal may be completely reconstructed. This principle is used in a number of known bandwidth compression schemes.

The present invention solves two basic difficulties with the method discussed above:

1. In the method just described, the previous output must always be in some form of storage in the receiver. If there should be any drift in this value (either electronic if it is stored in analog form or round-off if stored in digital form), the computed output will gradually drift from the correct output.
2. Taking only two samples may not produce as much reduction in power as would be possible, because there may be other high correlations in the data. For example, television pictures show high correlation from line to line, while speech is often has high correlations extending over substantial periods of time.

These two problems are solved in the invention described herein by "block coding." In general, an output sequence of $(n+1)$ samples is determined by $(n+1)$ input samples, as in equation A. The coefficients are chosen so that, given a continuous block of $(n+1)$ values of $u$, it is possible to compute the corresponding $(n+1)$ values of $s$. Thus, round-off errors and drift cannot affect a block of more than $(n+1)$ values. However, the receiver must always store the previous $(n+1)$ values of its input. The encoder must also store the $(n+1)$ previous values of its input. This may be done either digitally in a computer, or in analog form in a delay line.

The coefficients in equation A may be selected to minimize the power transmitted. This power is then converted into a bandwidth reduction by trading power for bandwidth, so that the transmitted signal has lower bandwidth but the same power as it had originally.

An additional important feature which comes from performing the bandwidth reduction in this way is that a uniform sampling rate may be maintained at the output. Numerous prior art schemes which used predictors of the form indicated did not send a sample if a predicted value was almost equal to the actual one. This introduces two problems: (1.) It is hard to take full advantage of the bandwidth reduction if the sampling rate is not known; (2.) The drift problem previously discussed becomes worse, since a definite display is always present between the two sets of outputs.

Figure 4:
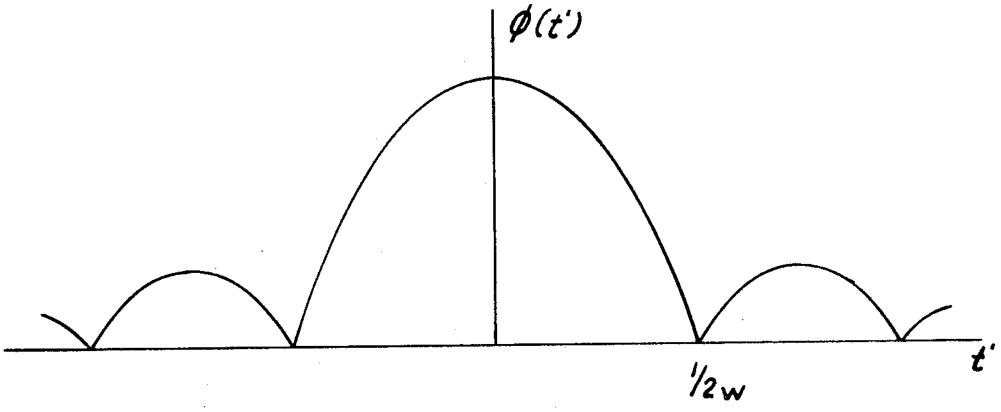
FIG. 4 and 5 are graphic depictions, on differing scales, of a typical autocorrelation function for a signal operated upon by the present invention.
Figure 5:
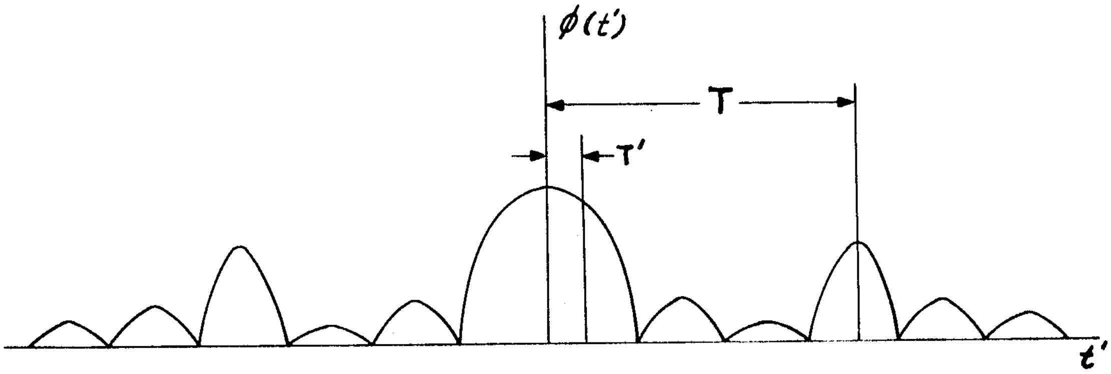

In accordance with the present invention, the autocorrelation for the time function whose bandwidth is to be compressed must be known approximately. A typical autocorrelation function $\Phi$ for a signal $s(t)$ with bandwidth W is shown in FIGS. 4 and 5 (these FIGS. depict the same function; the latter FIG., however, being on a relatively reduced scale and therefore showing variation of $\Phi$ $(t')$ over an extended period). Note that $\Phi$ is maximum for $t'=0$, and is equal to zero for $t=½$ W, the Nyquist interval. In a television signal there will be later maxima, when one comes to adjacent lines, where the points are in the vicinity of the first point. That is, all points in a certain area of a television picture are highly correlated. Since the picture is transmitted by lines, there will be a number of quite high maxima separated by a large amount.

In the entire development, it is assumed that the input signal $s(t)$ is sampled. As shown by numerous investigators, this rate must be greater than 2W, where W is the bandwidth of $s(t)$. Suppose the interval between samples is T'. This interval is not necessarily equal to the sampling interval T discussed previously, where T is the interval between the values of $s(t)$ used in the compression system, and as a matter of fact T might be much greater than T'. The instrumentation of the invention to be discussed hereinbelow assumes, however, that T is an integral multiple of T'. While theoretically this is not strictly necessary, obeying this relationship considerably simplifies the implementation. However, if T is an integral multiple of T', then the basic sampling frequency, 1/T', must be greater than ½W. This is because all samples separated by multiples of ½W are correlated (as may be seen in the FIGS. of the autocorrelation function). Since the sampling rate in most practical systems is considerably greater than ½W, this limitation does not seem serious from a practical viewpoint. In the following, the basic sampling interval T' is assumed to be given, although the knowledge that one is to use a bandwidth compression method might affect the exact value selected to a slight extent.

In forming $u(t)$ the value of T should be selected so that when intervals equal to T are marked off on the plot of the autocorrelation function, as shown in FIG. 5, the values of the autocorrelation function are as high as possible. If the autocorrelation function is high for $t'=T'$, then one can make T=T'.

If intervals of T are successively marked off on the autocorrelation function, one will eventually reach a point where the value of the autocorrelation function is low (i.e. samples are no longer highly correlated). The number of intervals so marked off is the maximum value of $n$—the number of elements used in forming $u(t)$. The minimum value of autocorrelation which is acceptable is an economic question. A high value of $n$ leads to a more expensive implementation of the bandwidth compression device but more actual reduction in bandwidth. If the minimum value of the autocorrelation function which is acceptable is low, then there will be less reduction for a given value of $n$. A suggested procedure is as follows:

1. Select some minimum value for the autocorrelation function.
2. Find T and $n$ as above.
3. Go through the design procedure for finding the A matrix discussed hereinbelow.
4. If $n$ appears to be uneconomically large, then select a higher minimum value of the autocorrelation function, and repeat the procedure.

One may alternately make a parametric study of the reduction obtained with different values of $n$, selected arbitrarily, and determine the most economic point. This latter procedure, although less elegant, will frequently prove more practical in an application of the present invention.

The following discusses the methods by which the coefficients $a_{ij}$ of Equation B hereinabove may be chosen. The method of selection will first be illustrated by means of an example, which will also be used as the example showing how the system may be instrumented. However, the invention is by no means limited to this single case, which has been chosen solely for ease of explanation. For this example the quantity $n$ in Equation A will be made equal to unity, so the Equation A reduces to $$u_1(t)=a_{01}s(t)+a_{11}s(t-T)$$
$$u_2(t)=a_{02}s(t)+a_{12}s(t-T)$$

Note that the coefficients $a_{ij}$ can be expressed in a matrix, which will be called A. Thus, $A=(a_{ij})$, where this notation means that the elements of A are expressed by the $a_{ij}$. Suppose $$A=(1.5)^{1/2}\begin{Bmatrix}1 & -1\\ 1 & 0\end{Bmatrix} \quad (4)$$

$$A^{-1}=\frac{1}{(1.5)^{1/2}}\begin{Bmatrix}0 & 1\\ -1 & 1\end{Bmatrix} \quad (5)$$

From elementary matrix algebra, it can be shown that the $s(t)$'s may be computed from the sequence of $u(t)$ if the elements of (3) are replaced by the elements of the inverse matrix of A, and the $s$'s and $u$'s are interchanged. Thus a fundamental requirement is that the matrix A be nonsingular. This will permit the reconstruction of the original signal by the same mechanism as by which the sequence of $u$'s were computed.

It can be shown in this case by simple algebra that if the correlation coefficient, $p_s(T)$, for two samples of $s$ spaced T seconds apart is greater than five-sixths; and the corrupting noise is white and Gaussian (where units are in terms of voltages and resistances are assumed to be 1 ohm, so that power is voltage squared), then the signal power will be reduced, and the original signal may be recovered with no degradation in signal-to-noise ratio. If more than two samples were used, then it would be possible to obtain power reductions for lower correlation coefficients.

The constraints which must be placed on the A matrix are: (1) it must be nonsingular; (2) the coefficients must be selected so that the power in the transmitted sequence $u(t)$ be less than in $s(t)$ by the desired amount; (3) when the signal $s(t)$ is recovered by the receiver, the reconstituted noise must be such that the signal-to-noise ratio is not degraded. Note that the received signal is operated on by $AA^{-1}$=unity matrix, while the noise is only operated on by the matrix $A^{-}$. The preceding example shows that in practical cases it is possible to select the coefficients to meet these conditions if sufficient redundancy is present. Theory shows that if redundancy exists, some set of coefficients exists which will reduce the bandwidth. The samples of $s(t)$ which form the "block" should be as highly correlated as possible, but they do not have to be sequential. For example, in a television picture, the samples might be a cluster of points. If the samples of $s(t)$ are not sequential, then the delays in Equation A would have to be modified to indicate the actual times of occurrence.

The more general technique to be utilized for selecting the A matrix may now be considered. For such purposes it may be assumed that T and $n$ have been determined as previously set forth. Calculating the A matrix may be separated into two parts: the first, calculation of the relative values of the components of A, subject to the constraint that the matrix be nonsingular; the second, calculation of a multiplying factor for the matrix to ensure that the transmitted signal has sufficient signal-to-noise ratio. Referring to equation (4) of the above example, this corresponds to obtaining the coefficients as shown, and the multiplying factor in front of the matrix in two steps.

Equation A can be written as $$u_j(t)=a_{ij}s(t-iT) \quad (6)$$

The power of $u_j$, equal to the expected value of $u_j^2$, is then equal to $$P_{uj}=\sum_{i,k} a_{ij}a_{kj}\phi((i-kT)) \quad (7)$$

The values of the autocorrelation function, $\Phi(t')$, can be read from the plot of FIGS. 4 and 5. This, then, is just a quadratic form in the $a$'s. The total power, $P_u$, of the entire $u$ matrix, is then $$P_u=\sum_j P_{uj} \quad (8)$$

Note that "power" is used here in the sense in which it is used in information theory. However, this power is proportional to the power in watts which would be transmitted over the line, if the $u$'s were transmitted. The proportionality factor is the quantity to be determined in step 2.

It is possible to find the value of the $a$'s which minimize equation (8) by ordinary calculus methods, since (8) is a quadratic form, and differentiating it with respect to each $a_{ij}$ will result in a series of simultaneous linear equations which can easily be solved. Although it is not a mathematical certainty that the resulting matrix will be nonsingular, the likelihood is very high that a nonsingular matrix will in fact result. Accordingly in practicing the invention one may simply first minimize (8) and test the resulting matrix. If the matrix turns out to be singular, it is possible to modify the $a$'s on an ad hoc basis to make it nonsingular. However, it is also possible to minimize (8) subject to the nonsingularity constraint.

According to this latter approach one observes that necessary and sufficient condition for a nonsingularity is that the determinant of A, denoted by det A, be nonzero. If a nonzero value is picked arbitrarily, say det A = M, then the minimization can be carried out directly by means of Lagrange multipliers. In this case, one minimizes the function F, given by $$F=P_u+L(\det A-M) \quad (9)$$

Where L is a Lagrange multiplier. Now, however, if $n$ is greater than 2 the result will no longer be a series of linear equations, and the calculation may have to be performed numerically. The value of M which is selected will also affect the minimum. Thus, one would have to perform the calculation for a series of values of M, and select the one which gave the minimum value of $P_u$, if a true optimization were desired. In a practical case, one may pick a few values of M and choose a result which gave a satisfactory reduction. The numerical techniques for performing these calculations are all standard and well known. Although quite time-consuming, they only have to be performed once, at the initial design stage for a system in accordance with the invention.

Calculation of the scale factor for the A matrix will now be discussed. A signal is formed by a series of $n$ $u$'s, followed by $n$ more $u$'s, and so on. The average power in each $u_j$ is proportional to the value given b by equation (8). In the amplitude technique to be set forth below in greater detail, several of these $u$'s are combined to give a composite signal of greater power level. Implementation will be shown for combining $n$ $u$'s, which is probably the simplest way, although again not absolutely necessary. Thus, the power in the final transmitted, bandwidth encoded signal will be proportional to $P_u$. This final signal must have sufficient amplitude to insure sufficient signal-to-noise ratio on the line. Thus, $P_u$ must be multiplied by some factor, $k$, to provide this sufficient value of signal. The theory of band-limited signals indicates that if sufficient redundancy exists in the original signal $s(t)$, a value of $k$ exists which will provide the same signal-to-noise ratio with the bandwidth compressed signal as with the original signal $s(t)$ if it were transmitted on the same line. Thus, if the signal-to-noise ratio is to be kept the same, $k$ may be computed directly. Note that the value of $k$ is also affected by the amplifiers, and other components which are used to finally send the signal. Thus, one computes the output signal amplitude with the values of A calculated previously, and adds sufficient gain to produce the desired signal power, a straightforward calculation.

Figure 1:
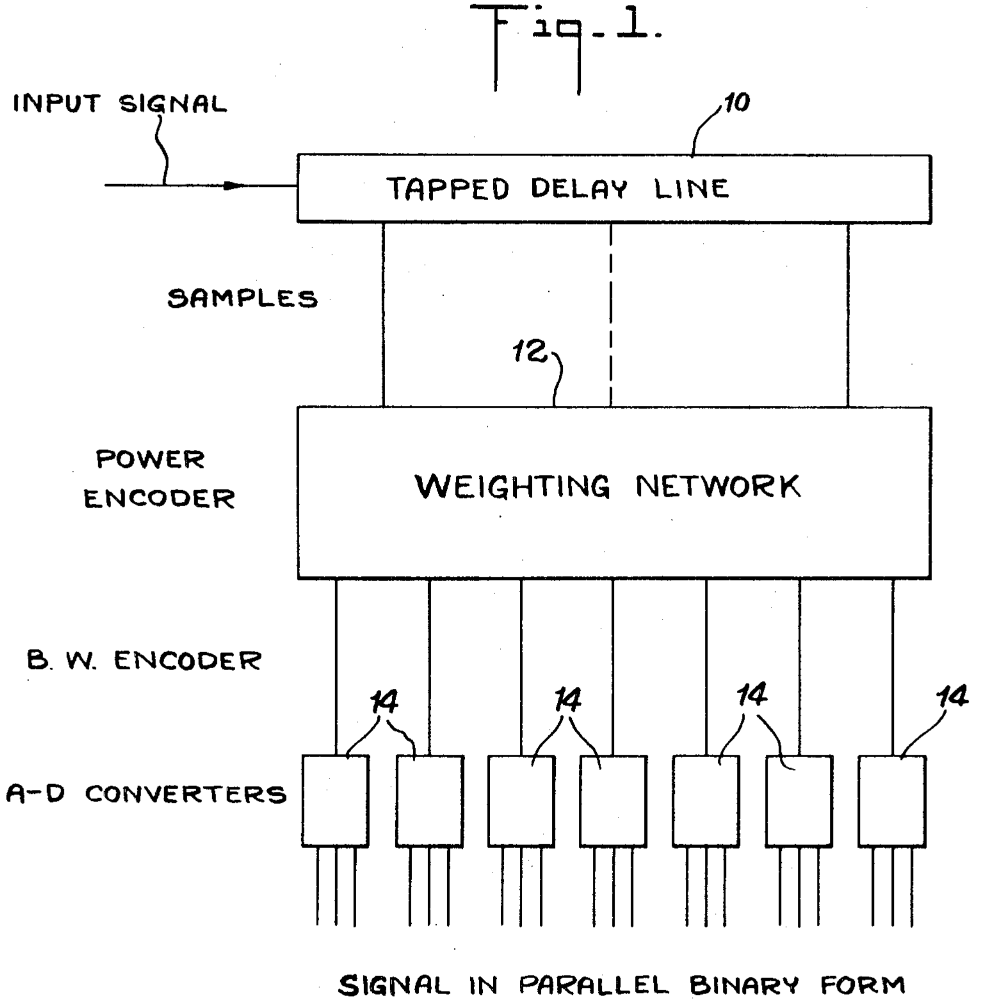
FIG. 1 is a block diagram of the system of the invention.

FIG. 1 is a block diagram of a combined power and bandwidth compression system in accordance with the invention. In this connection it may initially be observed that for an analog system, a sampler of a type such as is described in Millman and Taub, "Pulse and Digital Circuits," published by McGraw Hill, and a series of delay lines or tapped delay line are used to form the samples of $s(t)$ and store them temporarily. Whenever in this description and claims a tapped delay line is referred to, the term is also intended to include a series of two or more delay lines and vice versa. A resistor network weights the samples by the appropriate coefficients and adds them together in a manner such as has been described in standard texts on operational amplifiers. If it is desired to only conserve power and not bandwidth, then a second series of delay lines is used to transmit the $u(t)$'s in the appropriate sequence or order. In a digital system, the samples are stored in a computer and the weighting is done in the arithmetic unit of the computer in a manner such as has been described in "Numerical Methods for Scientists and Engineers" by R. Hammig, published by McGraw Hill.

The output of the power compressor is a series of samples of $u(t)$. The output sequence would be $u_0(t)$, $u_1(t)$, .... $u_n(t)$. The key to the decoding algorithm is that the different outputs (e.g. $u_3$ and $u_4$) are calculated from different coefficients (e.g. $a_0$, $a_1$, etc.) but all the coefficients ($a_0$, $a_1$, etc.) are inserted by a fixed network.

Basically, assume that the samples of the original signal have a maximum amplitude $S_o$ and for the accuracy desired, $S_o$ may be encoded into a binary number of B bits, so that $S_o=2^B$. Because of the encoding, the maximum value of the output of the power encoder $u(t)$, will be less than $S_o$ [since the power of $u(t)$ is less than the power of $S(t)$]. Call this maximum value $U_o$. Fewer binary bits will be required to encode $U_o$, say B'. Thus $U_o=2^{B'}$. For feasibility, B' must be less than B by some integer. Therefore, $U_o$ can not be greater than ½ $S_o$. For the purpose of illustration let $U_o$–$S_o/2^P$. Then, B=B'+$p$.

Now encode the samples $u(t)$ into binary numbers before they are rearranged serially by another delay line. On the average, B' bits will be required. Next, new binary numbers are formed by placing the binary numbers for blocks of $u$'s adjacent to each other and new binary composite numbers are transmitted. For example, suppose the $u(t)$'s are encoded into three bits (B=3). And suppose, for illustration, the following sequence is obtained:

$u(5)$–101(5); $u(t$–T)–011(3); $u(t$–2T)=111(7); and $u(t$–3T)=100(4).

The numbers in parentheses are the decimal equivalents of the binary numbers. Thus, if the signal were sampled in four places, as aforesaid, the maximum signal voltage to be transmitted would be 7.

Now to reduce the bandwidth by one-half, the sampling rate should be divided by 2. This can be accomplished by joining the four samples into two samples, as follows:

$u(t)$–101011(43) and $v(t$+2T)=111100(58).

It should be noted that binary 43 is binary 5 and binary 3 written together and binary 58 is binary 7 and binary 4 written together. In this circumstance, if each bit is represented by the same voltage step for $u$ and $v$, then the maximum signal voltage transmitted is 58 but the bandwidth has been reduced by 50 percent, because the sample rate has been halved. Thus, it is always possible to exchange or trade power for bandwidth. By taking larger blocks, the bandwidth may be reduced by an arbitrary factor. Thus, to reduce the bandwidth by a factor Q, the sequence $v(t)$ must consist of binary numbers containing QB' bits with a sample transmitted very QT seconds.

If the voltage representing one bit is the same for $u$ and $v$, then the power transmitted would be much greater for the $v$ sequence without power encoding. If $U_o$ is sufficiently smaller then $S_o$, then the power in $v$ may be substantially equal to the power in $s$ but $v$ will have a lower bandwidth.

It can be seen that power is traded for bandwidth in an optimum manner. Note also that the power compressor produces its output in blocks which can be the same blocks as are used for the bandwidth compressor.

As seen in FIG. 1 the input signal $s(t)$ is fed into two tapped delay lines 10 from where it is gated to resistor (Weighting) network 12 which applies the weighting factors. The outputs of this weighting network 12 are the samples $u(t)$. There will be $n$ such samples existing simultaneously on $n$ different leads in the output of network 12. Each of these $n$ outputs is fed to the input of an analog to digital converter 14 each of which encodes its signal into binary code. The outputs of the converters 14 are connected in parallel. If each converter or encoder 14 produces B' bits, there will be $nB'$ output wires which represent the signal $v(t)$ in parallel form (namely, as a parallel binary number).

If it is desired to transmit the signal as an analog signal, the parallel binary number is fed directly into a digital-to-analog converter to produce a pulse for transmission. If a digital signal is desired, the outputs of the analog-to-digital converters 14 are gated to transform the parallel binary number into a series of binary numbers which may be transmitted and detected in the usual manner.

FIG. 2 is illustrative of a system of the invention for reducing the bandwidth to one quarter the original bandwidth. The circuit diagram is partially in block form and partially in schematic form. The amplifiers, indicated by triangles, may be of any standard type which have sufficient bandwidth and gain. The delay lines and analog-to-digital converters or encoders are also of any standard type having suitable characteristics. The gate signals are produced in a manner which is also well known in the art and serve to control the signal transmission as shall be described hereafter.

Figure 2A:
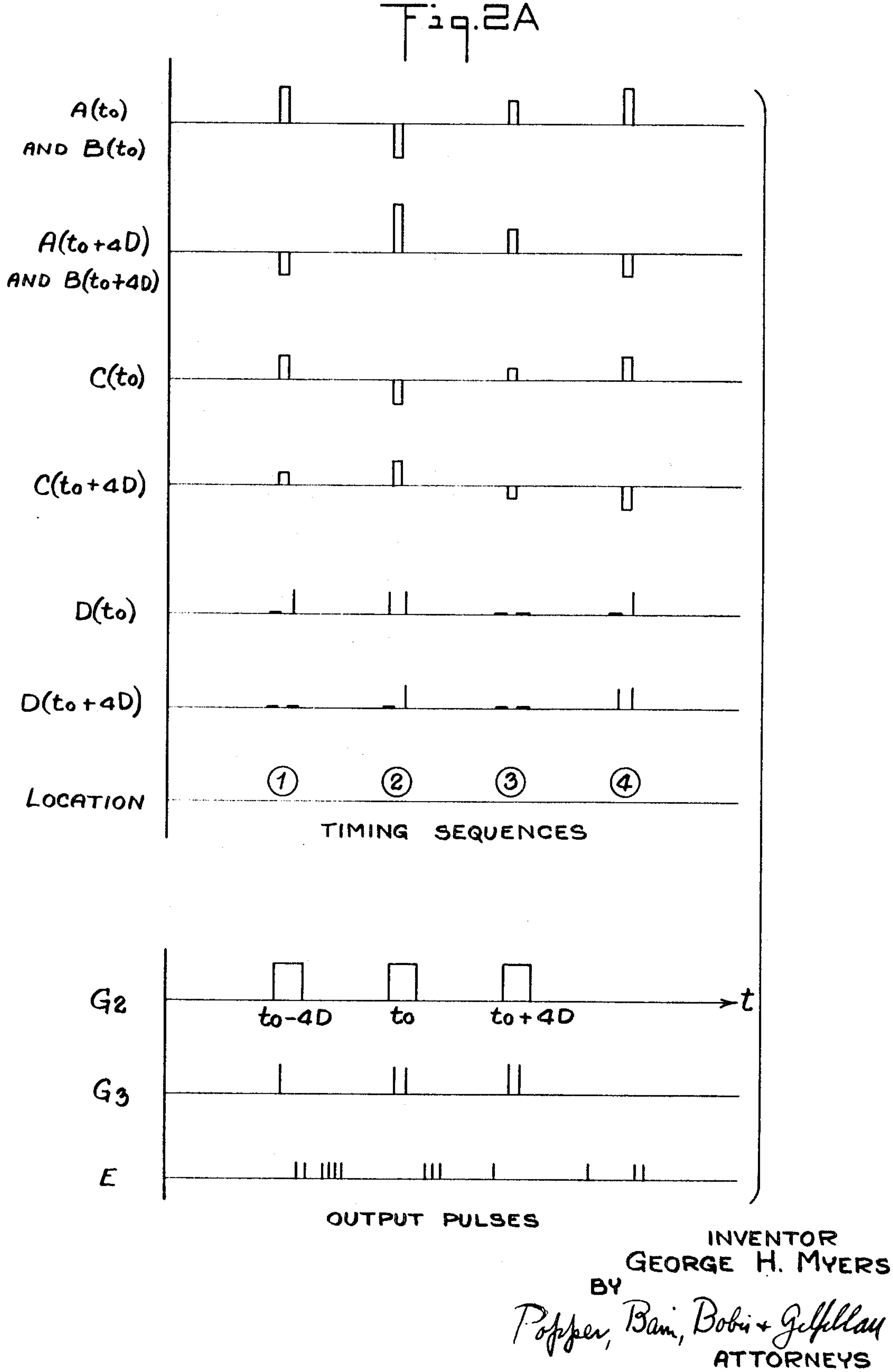
FIG. 2A is an illustration of the voltage-time plots at various points in the circuit of FIG. 2.

FIG. 2A is a diagram showing the relative timing of the voltages and sequencing signals at different points in the circuit diagram. The voltage and sequencing signal diagrams are keyed to points in the circuit diagram which has been divided into four horizontal rows labeled A, B, C, and D. These rows correspond to similarly marked rows in the sequence diagrams to represent two different events at the same point at different times.

The signals are plotted as a function of time. The four columns denominated 1, 2, 3, and 4 on the line marked "location" on FIG. 2A correspond to the four columns of FIG. 2 in which the elements are marked with the corresponding superscript.

At the outputs of the digital gates, the outputs switch into eight paths wherein each of the four original columns divides into two columns. These gates have been denominated with a subscript 1 or 2, so that the digital gates are designated $30_1^1$, $30_2^1$, $30_1^2$, $30_2^2$, etc.

In FIG. 2, which is illustrative of the basic invention, it is desired to reduce the bandwidth of the signal applied to the input of amplifier 16 by a factor of four. The bandwidth is assumed to be W cycles per second and the Nyquist interval D=V/2. It is also assumed that there is sufficient redundancy in the signal to permit such bandwidth compression and that suitable coefficients for the weighting network have already been determined —in the manner previously set forth. The example set forth previously will be demonstrated here.

The signal from the output of amplifier 16 is fed to delay 18, which has a delay of D seconds, the Nyquist interval. The signal in column 1 is not delayed. The signal in column 2 is delayed D seconds by delay line $18_2^1$, the signal in column 3 is delayed 2D seconds by delay line $18_3^2$ and the signal in column 4 is delayed 3D seconds by delay line $18_4^3$. The superscript designates the column at the input to that delay line or section and the subscript designates the column at its output.

Each of the four signals is fed to its respective buffer amplifier $20^1$, $20^2$, $20^3$ and $20^4$. These buffer amplifiers isolate the delay line outputs from the sampling networks $22^1$, $22^2$, $22^3$ and $22^4$ to which the output of each of these is fed. The signals are sampled every 4D seconds in the sampling networks $22^1$, etc. by means of gate $G_2$, which is of the type well known in the art (see Millman and Taub, op. cit.) and its details are not shown. Under certain conditions buffer amplifiers are not required.

The gate pulses $G_2^1$ and $G_2^2$ are shown on the figure. The gate signals are used to make the voltage of the signals at level B equal to those at level A at the time the gate pulses occur. The gated outputs from the sampling networks $22^1$, etc. are then fed to a set of four resistors $24^1$, $24^2$, $24^3$ and $24^4$ whose output is connected to an input of an associated amplifier $26^1$, $26^2$, $26^3$ and $26^4$. Thus, each gated signal from each column 1, 2, 3 or 4 appears at the input of each amplifier 26.

Feedback resistors $R_f^1$, $R_f^2$, $R_f^3$ and $R_f^4$ are connected between the output and input of each amplifier $26^1$, etc. The amplifiers $26^1$ etc. perform the weighting function. If we denote the feedback resistor at any amplifier, said $j$, as $R_f^j$ and the four input resistors to that amplifier as $R_1^j$, $R_2^j$, etc. and further use $w_i$ to designate the input voltage to the network 24 where $i$=1, 2, 3, 4, then the output of amplifier $26^j$, which is called $v_j$, will be given by $$v_j=w_i(R_f^j/R_{ij})$$

Therefore, proper weighting can be achieved by proper selection of the resistors. More specifically the $R_i^j$ and $R_f^j$ resistors are chosen so that the values of transformed samples $v_j$ are consistent with the requirements of equation B, the values of $a_{ij}$ and $n$ therein (in equation B) having been determined in accordance with the procedure previously set forth. For example, suppose all the $R_f$=1,000 ohms, and the other resistors are $R_i^j$=1,000$i$+100$j$, so $R_i^2$=1,200. Then, $v_1=1.1w+1.2w_2+1.3w_3+1.4w_4$. These numbers are selected to make a simple example. The actual coefficients would depend on the computed values for the matrix A. If sign reversals are required, then additional amplifiers may be necessary to change polarity.

The weighted outputs of the amplifiers $26^1$, etc. are changed to a two-bit digital code by means of analog digital converters $28^1$, $28^2$, $28^3$ and $28^4$. The outputs of the four converters $28^1$ to $28^4$ are changed to one eight-bit number ($2^8$=256 levels) by means of eight digital AND-gates $30_1^1$, $30_2^1$, $30_1^2$, $30_2^2$, $30_1^3$, $30_2^3$, $30_1^4$ and $30_2^4$. The outputs from these gates 30 are separated by $d$ seconds in a delay line having seven taps or a series of delay lines $32^1$, $32^2$, .... $32^7$. The value of $d$ must be less than ½ D but its exact value depends upon the circuit parameters.

The tapped delay line converts the parallel binary number into a serial binary number for transmission over the transmission medium. The width of the pulses will be approximately equal to the width of gating pulse $G_3$. The width of this pulse must be less than $d$ seconds and probably less that ½$d$ seconds. If $d$ is equal to or less than ½D, the entire serial binary number may be transmitted in 4D seconds or less. It should be noted that the output at level E following $t_o$ and the output at level E at $t_o$+4D consists of the outputs at level D at $t_o$+4D.

The output from the delay lines 32 is fed through amplifier 34 for transmission as a digital signal which is shown at level E on the left side of FIG. 2. If an analog signal is to be transmitted, a typical digital-to-analog converter, such as is indicated as a dotted block on FIG. 2, is used at the output of either delay lines 32 or amplifier 34.

FIG. 3 illustrates a system similar to that of FIG. 2 for the mathematical example described earlier in this specification. The system of FIG. 3 produces a bandwidth reduction of one-half. Thus, the first delay line 19 contains only one element, and the number of all succeeding components is reduced by one-half. Amplifiers $21^1$ and $21^2$ are similar to amplifiers 20 of FIG. 2 and produce outputs of opposite polarity. AND-gates $23^1$ and $23^2$ are similar to gates 22, amplifiers 27 are similar to amplifiers 26. analog-to-digital converters 29 are similar to converters 28, AND-gates 31 are similar to gates 30, delay lines 33 are similar to delay lines 32 and amplifier 35 is similar to amplifier 34.

The foregoing which is presented as illustrative, is not intended to limit the scope of the invention since obvious modifications may be made by one skilled in the art without departing from the spirit of the invention.

What is claimed is:

1. A method for compressing the bandwidth of a signal $2(t)$ which comprises:

a. applying the signal to a first means adapted for providing simultaneously at $n+1$ outputs a group of samples of $s(t)$ representing individually the successive sampled values of $s(t)$ at the times $t$, $(t-T)$ .... $(t-nT)$ where T is a fixed time interval;

b. gating said group of samples to a plurality of weighting networks adapted to weight the individual samples into a new group of $(n+1)$ samples of another signal $u(t)$, such that $$u_j(t_i)=\sum_{i=0}^{n} a_{ij}s(t-iT),$$

where $j$–0, .... $1$, . . . . $n$, the coefficients $a_{ij}$ inserted by said weighting network being selected to meet the constraints that:

1. the matrix $A=a_{ij}$ be nonsingular whereby $s(t)$ is recoverable from $u(t)$,
2. the power in the transmitted sequence $u(t)$, be less than in $s(t)$ by a desired amount, and
3. when the signal $s(t)$ is recovered the reconstituted noise is such that the signal-to-noise ratio is not degraded, sufficient redundancy being present in $s(t)$ to enable imposition of all three of said constraints;

c. applying the output of each weighting network to a separate analog-to-digital converter, each of which has a plurality of outputs, the total number of these outputs being determined by the number of levels required by the signal and where the number of levels $= 2^x$ where $x$ is the total number of such outputs;

d. applying the signal from each of these plurality of outputs to a second means for producing a plurality of outputs wherein each succeeding output is delayed from the preceding output and the delay between adjacent outputs of the said second means is equal to or less than one-half the time interval T;

e. transmitting the output of the said second means as a serial binary number.

2. The method of claim 1 wherein the first means is a tapped delay line.

3. The method of claim 2 wherein the second means is a tapped delay line.

4. The method of claim 1 wherein the second means is a tapped delay line.

5. The method of claim 1 wherein the output of the second means is fed to a digital-to-analog converter whose output is an analog signal.

6. The method of claim 1 wherein the interval T is equal to the Nyquist interval.

7. A system for compressing the bandwidth of a signal which comprises:

a. first means for producing a plurality of outputs wherein each succeeding output is delayed from the preceding output to which the signal to be compressed is applied;

b. a plurality of networks to each of which one of the plurality of outputs is applied;

c. a gate supplying a gate signal to each network so that the voltage at its output is equal to the voltage at its input, d. a plurality of weighting networks having their inputs connected to the output of each network;

e. each of the weighting networks comprising an amplifier, an input resistor connected between the network and the input to the amplifier and a feedback resistor connected between the output and input of the amplifier;

f. a plurality of analog-to-digital converters;

g. the output of each weighting network being connected to one of the analog-to-digital converters, there being an analog-to-digital converter connected to each weighting network;

h. a plurality of AND gates;

i. each analog-to-digital converter having a plurality of outputs each of which is connected to one of the AND gates, the number of outputs being determined by the number of signal levels required to transmit the compressed signal as given by number of levels $= 2^x$ where $x$ is the number of outputs;

j. second means for producing a plurality of outputs wherein each succeeding output is delayed from the preceding output;

k. the output of each AND gate being connected to one of the outputs of the second means, the delay between adjacent taps thereof being equal to or less than one-half that of the delay between outputs of the first delay line;

l. the output of the second means being transmitted as a serial binary number.

8. The system of claim 7 including a digital-to-analog converter connected at the output of the second means to thereby transmit an analog signal.

9. The system of claim 8 wherein the delays between outputs of the first means are equal to each other and to the Nyquist interval.

10. The system of claim 7 wherein the delays between outputs of the first means are equal to each other and to the Nyquist interval.

11. The system of claim 7 wherein the first means and the second means are tapped delay lines.

12. The system of claim 7 wherein the first means is a tapped delay line.

13. The system of claim 7 wherein the second means is a tapped delay line.

14. A system for compressing the bandwidth of a signal $s(t)$, while substantially retaining intelligence and signal-to-noise ratio, comprising:

a. first means adapted for providing simultaneously at $n+1$ outputs a first group of samples of $s(t)$ representing individually the successive sampled values of $s(t)$ at the times $t$, $(t-T)$, ... $(t-nT)$, where T is a fixed time interval;

b. means for gating said group of samples to;

c. a plurality of weighting networks adapted to weight the individual samples into a new group of $(n+1)$ samples of another signal $u(t)$, such that $u_j(t_i)=\sum_{i=0}^{n} a_{ij}s(t-iT)$, where $j$–0, 1, .... $n$, the coefficients $a_{ij}$ inserted by said weighting network being selected to meet the constraints that:

1. the matrix A–$a_{ij}$ be nonsingular whereby $s(t)$ is recoverable from $u(t)$,
2. the power in the transmitted sequence $u(t)$, be less than in $s(t)$ by a desired amount, and
3. when the signal $s(t)$ is recovered the reconstituted noise is such that the signal-to-noise ratio is not degraded, sufficient redundancy being present in $s(t)$ to enable imposition of all three of said constraints;

d. a plurality of A to D converters connected to receive the $(n+1)$ samples of said $u(t)$ signal and convert said samples into parallel binary outputs; and e. means to combine said parallel binary outputs into serial binaries with bit sequences corresponding to those of the adjoined parallel outputs, said serial binaries constituting the system output signal for transmission.

15. A system according to claim 14 wherein said first means comprises a tapped delay line.

16. A system according to claim 15 wherein said means for combining said parallel binary outputs comprises a tapped delay line and gating means for applying said parallel outputs to the taps of said line.

* * * * *